United States Patent
Sattler et al.

(10) Patent No.: US 11,124,183 B2
(45) Date of Patent: Sep. 21, 2021

(54) METHOD FOR MANOEUVRING A MOTOR VEHICLE COMPRISING DETERMINATION OF A DISTANCE TO GO FOR BRAKE ACTUATION, CONTROL UNIT, DRIVER ASSISTANCE SYSTEM, AND MOTOR VEHICLE

(71) Applicant: VALEO Schalter und Sensoren GmbH, Bietigheim-Bissingen (DE)

(72) Inventors: Stefanie Sattler, Bietigheim-Bissingen (DE); Steffen Luecker, Bietigheim-Bissingen (DE); Malte Joos, Bietigheim-Bissingen (DE); Jean-Francois Bariant, Bietigheim-Bissingen (DE); Frank Blinkie, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 159 days.

(21) Appl. No.: 16/080,853

(22) PCT Filed: Feb. 28, 2017

(86) PCT No.: PCT/EP2017/054551
§ 371 (c)(1),
(2) Date: Aug. 29, 2018

(87) PCT Pub. No.: WO2017/148884
PCT Pub. Date: Sep. 8, 2017

(65) Prior Publication Data
US 2019/0092319 A1 Mar. 28, 2019

(30) Foreign Application Priority Data
Mar. 1, 2016 (DE) .................... 10 2016 103 673.0

(51) Int. Cl.
*B60W 30/09* (2012.01)
*B60W 30/08* (2012.01)
(Continued)

(52) U.S. Cl.
CPC ............ *B60W 30/09* (2013.01); *B60W 10/18* (2013.01); *B60W 30/06* (2013.01); *B60W 30/08* (2013.01);
(Continued)

(58) Field of Classification Search
CPC .... B60W 30/09; B60W 30/08; B60W 30/095; B60W 30/06; B60W 10/18;
(Continued)

(56) References Cited

U.S. PATENT DOCUMENTS

| 6,353,788 B1 * | 3/2002 | Baker | ................ B60K 31/0008 340/435 |
| 2005/0096841 A1 * | 5/2005 | Gedik | ................ G06F 16/2264 701/408 |

FOREIGN PATENT DOCUMENTS

| DE | 10 2010 020206 A1 | 11/2011 | |
| DE | 102014107827 A1 * | 12/2015 | ........... G01S 15/931 |

(Continued)

OTHER PUBLICATIONS

Translated document of Gotzig DE-102014107827-A1 (Year: 2014).*
(Continued)

*Primary Examiner* — Navid Ziaeianmehdizadeh
(74) *Attorney, Agent, or Firm* — Osha Bergman Watanabe & Burton LLP

(57) ABSTRACT

A method for manoeuvring a motor vehicle is disclosed. In the method, a trajectory for manoeuvring the motor vehicle is determined. During the manoeuvring of the motor vehicle along the trajectory, a notification distance, which describes a distance to a turning point of the trajectory, and a collision (Continued)

distance, which describes a distance to an object in a surrounding of the motor vehicle, are determined. Based on the notification distance and the collision distance, a distance to go until the actuation of a brake system of the motor vehicle is determined. Based on changes in the time curve of the notification distance, a corrected notification distance is determined in an ongoing manner. Based on changes in the time curve of the collision distance, a corrected collision distance is determined in an ongoing manner. The distance to go is determined based on the corrected notification distance and the corrected collision distance.

13 Claims, 10 Drawing Sheets

(51) Int. Cl.
*B60W 30/095* (2012.01)
*B60W 30/06* (2006.01)
*B60W 10/18* (2012.01)
*G05D 1/00* (2006.01)
*G05D 1/02* (2020.01)

(52) U.S. Cl.
CPC ...... *B60W 30/095* (2013.01); *B60W 30/0953* (2013.01); *B60W 30/0956* (2013.01); *G05D 1/0088* (2013.01); *G05D 1/0212* (2013.01); *B60W 2554/00* (2020.02); *G05D 2201/0213* (2013.01)

(58) Field of Classification Search
CPC ......... B60W 30/0953; B60W 30/0956; B60W 2550/10; G05D 1/0088; G05D 1/0212; G05D 2201/0213; B60Y 2400/81
See application file for complete search history.

(56) References Cited

FOREIGN PATENT DOCUMENTS

| | | |
|---|---|---|
| DE | 10 2014 111122 A1 | 2/2016 |
| EP | 2386463 B1 * | 5/2019 |
| KR | 10-2014-0039841 A | 4/2014 |

OTHER PUBLICATIONS

Translated document of Wendler EP-2386463-B1 (Year: 2010).*
Machine Translation of KR 10-2014-0039841 (Year: 2014).*
International Search Report issued in PCT/EP2017/054551 dated May 29, 2017 (2 pages).
Written Opinion of the International Searching Authority issued in PCT/EP2017/054551 dated May 29, 2017 (6 pages).
German Search Report issued in DE 10 2016 103 673.0 dated Nov. 8, 2016 (7 pages).
The Notice of Final Rejection issued in corresponding Korean Application No. 10-2018-7025095, dated Feb. 11, 2020 (8 pages).

* cited by examiner

METHOD FOR MANOEUVRING A MOTOR VEHICLE COMPRISING DETERMINATION OF A DISTANCE TO GO FOR BRAKE ACTUATION, CONTROL UNIT, DRIVER ASSISTANCE SYSTEM, AND MOTOR VEHICLE

The present invention relates to a method for manoeuvring a motor vehicle, in which a trajectory for manoeuvring the motor vehicle is determined, during the manoeuvring of the motor vehicle along the trajectory, a notification distance, which describes a distance to a turning point of the trajectory, and a collision distance, which describes a distance to an object in a surroundings of the motor vehicle, are determined, and, on the basis of the notification distance and the collision distance, a distance to go until the actuation of a brake system of the motor vehicle is determined. In addition, the present invention relates to a control unit for a driver assistance system and a driver assistance system for a motor vehicle. Finally, the present invention relates to a motor vehicle comprising such a driver assistance system.

Various methods are known from the prior art, which are used for manoeuvring a motor vehicle. For this purpose, the motor vehicle can be manoeuvred semi-autonomously, for example. In this case, the motor vehicle is moved along a predetermined trajectory with the aid of the driver assistance system, wherein the driver assistance system engages in a steering system of the motor vehicle. The driver continues to actuate the brake and the gas pedal. Furthermore, methods are known in which the motor vehicle is manoeuvred autonomously or fully autonomously. In this case, the driver assistance system also engages in a drive engine and the brake system of the motor vehicle.

To regulate the braking of the motor vehicle during the manoeuvring of the motor vehicle, a so-called distance to go interface is frequently used. This outputs the distance to be travelled and/or a distance to go and the brake system of the motor vehicle then takes over the regulation and thus the implementation of the braking. In the normal case, the distance to go is described on the basis of a notification distance, which describes a distance to a turning point of the trajectory and/or the planned path. This notification distance is also referred to as the Distance To Hint (DTH). A collision distance can additionally be determined, which describes a distance to an object in the surroundings of the motor vehicle. This collision distance can also be referred to as the Distance To Collision (DTC). The disadvantage in this case is that the distance to go can have a greatly varying curve and thus choppy braking will be induced. This is because, on the one hand, the system switches back and forth between the notification distance and the collision distance according to minimal distance. The collision distance can also have chronological changes, since it is determined as a function of the present trajectory and/or a present vehicle path and the stability of the objects which are detected with the aid of sensors.

It is the object of the present invention to disclose a solution for how a distance to go until the actuation of a brake system of the motor vehicle during manoeuvring of the motor vehicle can be determined more reliably.

This object is achieved according to the invention by a method, by a control unit, by a driver assistance system, and by a motor vehicle having the features according to the respective independent claims. Advantageous refinements of the present invention are the subject matter of the dependent claims.

In one embodiment of a method according to the invention for manoeuvring a motor vehicle, in particular a trajectory for manoeuvring the motor vehicle is determined. During the manoeuvring of the motor vehicle along the trajectory, a notification distance, which describes a distance to a turning point of the trajectory, and a collision distance, which describes a distance to an object in a surroundings of the motor vehicle, are determined. Furthermore, on the basis of the notification distance and the collision distance, a distance to go until the actuation of a brake system is preferably determined. Furthermore, a corrected notification distance is determined in an ongoing manner on the basis of changes in the time curve of the notification distance. Furthermore, a corrected collision distance is determined in an ongoing manner in particular on the basis of changes in the time curve of the collision distance. The distance to go is preferably determined on the basis of the corrected notification distance and the corrected collision distance.

A method according to the invention is used for manoeuvring a motor vehicle. For this purpose, a trajectory for manoeuvring the motor vehicle is determined. During the manoeuvring of the motor vehicle along the trajectory, a notification distance which describes a distance to a turning point of the trajectory, and a collision distance, which describes a distance to an object in a surroundings of the motor vehicle, are determined. A distance to go until the actuation of a brake system of the motor vehicle is then determined on the basis of the notification distance and the collision distance. In addition, a corrected notification distance is determined in an ongoing manner on the basis of changes in the time curve of the notification distance and a corrected collision distance is determined in an ongoing manner on the basis of changes in the time curve of the collision distance. The distance to go is then determined on the basis of the corrected notification distance and the corrected collision distance.

The vehicle is to be manoeuvred with the aid of the method in order to assist the driver of the motor vehicle. It is provided in particular in this case that the motor vehicle is autonomously manoeuvred. For example, the motor vehicle can be autonomously parked in a parking space with the aid of the method. The parking space can be detected on the basis of objects which delimit the parking space. The parking space can also be detected on the basis of roadway markings. Firstly, a trajectory for manoeuvring the motor vehicle is determined. The trajectory describes a path or a vehicle path for the future movement of the motor vehicle. In this case, the trajectory can be determined such that it has one or more turning points. At a turning point, for example, the travel direction of the motor vehicle can be changed. At a turning point, it is possible to engage in the steering system of the motor vehicle.

In addition, it is checked whether at least one object and/or obstruction is located in the surroundings of the motor vehicle. The motor vehicle and/or the driver assistance system can have multiple sensors, which are arranged distributed on the motor vehicle. The sensors can be, for example, ultrasound sensors, radar sensors, laser scanners, lidar sensors, or cameras. A distance to the object and in particular a relative position between the motor vehicle and the object can be determined with the aid of the sensors. It can also be provided that the object is entered in a digital surroundings map, which describes the surroundings of the motor vehicle. The object can be an object which delimits a parking space. If no object is located in the surroundings, the collision distance can have a maximum value or can be maximal. During the movement of the motor vehicle along the trajectory, on the one hand, a notification distance (DTH—distance to hint) and, on the other hand, a collision distance (DTC—distance to collision) are determined. The notification distance describes the distance to the turning point of the trajectory during the travel of the motor vehicle along the trajectory. The collision distance describes the distance to the at least one object in the surroundings during the travel along the trajectory if the object is present. The distance to go, which describes the remaining distance until an actuation of the brake system, can then be determined on the basis of the notification distance and/or the collision distance. If the end of the distance to go is thus reached, braking is carried out using the motor vehicle.

It is provided according to the invention that a time curve of the notification distance is determined. The time curve of the notification distance is studied for changes and/or for fluctuations. A corrected notification distance can then be determined in an ongoing manner depending on the changes which have been detected in the time curve of the notification distance. In the same manner, a time curve of the collision distance is determined. The time curve of the collision distance is also studied for changes and/or fluctuations. A corrected collision distance can then be determined in an ongoing manner on the basis of the detected changes in the time curve of the collision distance. In particular, the time curve of the notification distance can be smoothed and the corrected notification distance can be determined in an ongoing manner therefrom. It can also be provided that the time curve of the collision distance is smoothed and the corrected collision distance is determined in an ongoing manner therefrom. The distance to go for the actuation of the brake system can then be determined from the corrected notification distance and the corrected collision distance. Overall, a smoothed distance to go can be determined from the corrected notification distance and the corrected collision distance. Therefore, changes in the curve of the notification distance and/or the collision distance, which are induced as a result of measurements, possibly remain unconsidered. If no object or obstruction is located in the surroundings of the motor vehicle, the distance to go can be determined on the basis of the corrected notification distance, since the collision distance or the corrected collision distance is maximal in this case. This enables a reliable determination of the distance to go. Furthermore, choppy braking and thus disconcerting of the driver can be prevented by the smoothed distance to go.

To determine the corrected notification distance and/or the corrected collision distance, a jump in the time curve of the notification distance and/or in the time curve of the collision distance is preferably detected as a change. In other words, it is checked whether the time curve of the notification distance has jumps and/or noticeable rises or falls. A jump describes in particular a predetermined change of the notification distance and/or the collision distance within a predetermined chronological duration. These jumps can then be smoothed in order to determine the corrected notification distance in an ongoing manner. The jumps can also be smoothed in the time curve of the collision distance in order to determine the corrected collision distance. A varying curve of the distance to go can thus be suppressed.

If a positive jump in the time curve of the notification distance and/or the collision distance is detected as a change and a level of the positive jump falls below a predetermined threshold value, the corrected notification distance and/or the corrected collision distance is preferably assumed to be constant. As soon as the time curve of the notification distance and/or the time curve of the collision distance has been determined, it can be checked whether the time curves have a positive jump, i.e., a sudden elevation. A threshold value can be respectively specified for the positive jump of the time curve of the notification distance and the positive jump of the time curve of the collision distance. If the respective positive jump is below this threshold value, a constant value can be assumed as the corrected notification distance and/or as the corrected collision distance. This constant value can be assumed until the time curve of the notification distance or the time curve of the collision distance, respectively, again reaches this constant value. Comparatively small positive jumps can thus be smoothed in a simple manner.

If a positive jump in the time curve of the notification distance and/or the collision distance is detected as a change and a level of the positive jump exceeds a predetermined threshold value, the corrected notification distance and/or the corrected collision distance can preferably be elevated. If the positive jump in the time curve of the notification distance or in the time curve of the collision distance, respectively, is greater than the respective predetermined threshold value, the corrected notification distance or the corrected collision distance, respectively, can be elevated consistently from the point in time of the jump. In other words, a ramp is provided, along which the corrected notification distance or the corrected collision distance, respectively, is elevated. In this case, the corrected notification distance or the corrected collision distance, respectively, can each be elevated by a predetermined increment in successive cycles until the time curve of the notification distance or the collision distance, respectively, is reached again. This enables simple smoothing of comparatively large jumps in the time curve of the notification distance and/or the collision distance.

If a negative jump is detected as a change in the time curve of the notification distance, a value is preferably added to the time curve of the notification distance to determine the corrected notification distance. In other words, an offset can be added to the time curve of the notification distance as soon a negative jump is present in the time curve of the notification distance. The negative jump describes in particular a sudden drop of the notification distance. This offset or value can be added to the time curve of the notification distance as long as this negative jump is present and/or has been detected. A negative jump in the notification distance can thus be smoothed in a simple manner.

If a negative jump is detected as a change in the time curve of the collision distance, the collision distance is preferably assumed as the corrected collision distance. In other words, negative jumps in the time curve of the collision distance are not smoothed. Such negative jumps can occur, for example, if dynamic and/or moving objects are detected with the aid of the sensors and the collision distance is thus reduced. In this case, the present or the measured collision distance is used as the corrected collision distance. The safety can thus be ensured in particular in the presence of dynamic obstructions and/or objects.

Furthermore, it is advantageous if the distance to go is determined on the basis of a minimum of the corrected collision distance and the corrected notification distance if the corrected notification distance is greater than the corrected collision distance. In order to determine the distance to go, the minimum of the corrected collision distance and the corrected notification distance is used. However, if the corrected collision distance is less than the corrected notification distance, the corrected collision distance is used to determine the distance to go. A collision with an object can thus be reliably prevented.

In a further embodiment, to determine the corrected notification distance and/or the corrected collision distance, jumps between the time curve of the notification distance and the time curve of the collision distance are smoothed. If a change is made between the collision distance and the notification distance or between the notification distance and the collision distance during the computation of the distance to go, jumps in the overall resulting curve of the distance to go can also be detected and smoothed here. It can also be provided here that the distance for the distance to go is kept constant or a ramp is elevated accordingly for the jumps between the transitions between the notification distance and the collision distance. A threshold value can be specified here for the curve of the distance to go. A varying curve of the distance to go can thus be avoided.

In a further embodiment, a notification is output if the notification distance is exceeded during the manoeuvring of the motor vehicle. In other words, a flag can be set if the determined notification distance is exceeded during the manoeuvring of the motor vehicle. This flag can be set until the vehicle is at a standstill. If the notification distance is exceeded during the manoeuvring along the trajectory, it can have a negative value. Subsequently, the motor vehicle can be moved further in the opposite travel direction or can be moved further in the same direction. A notification is therefore output if the originally determined turning point is already reached. Furthermore, it can be provided that the distance to go is determined upon the exceeding of the notification distance on the basis of the minimum of the corrected notification distance and the corrected collision distance.

Furthermore, it is advantageous if a determination of the corrected notification distance and/or the corrected collision distance is updated after a gear change of the motor vehicle. In other words, the method is restarted if a gear change and/or a change of the travel direction is carried out. It can also be provided that the method is restarted if the motor vehicle was stopped and/or was decelerated at the end of the distance to go and at the same time the situation has changed in such a manner that it can continue to drive in the same direction as before. The corrected collision distance and the corrected notification distance of the respective sections of the trajectory can thus be reliably determined.

A control unit according to the invention for a driver assistance system of a motor vehicle is designed to carry out a method according to the invention. The control unit can be formed in particular by an electronic control device of the motor vehicle.

A driver assistance system according to the invention for a motor vehicle comprises a control unit according to the invention. The driver assistance system can comprise a plurality of sensors, using which objects in the surroundings of the motor vehicle can be detected. These sensors can be connected to the control unit for data transmission.

A motor vehicle according to the invention comprises a driver assistance system according to the invention. The motor vehicle is designed in particular as a passenger automobile.

The preferred embodiments presented with reference to the method according to the invention and the advantages thereof apply accordingly to the control unit according to the invention, the driver assistance system according to the invention, and the motor vehicle according to the invention.

Further features of the invention result from the claims, the figures, and the description of the figures. The features and feature combinations mentioned above in the description and the features and feature combinations mentioned hereafter in the description of the figures and/or shown solely in the figures are usable not only in the respective specified combination but rather also in other combinations or alone, without leaving the scope of the invention. Therefore, embodiments of the invention are also to be considered to be comprised and disclosed which are not explicitly shown and explained in the figures, but originate and are producible from the explained embodiments by way of separate feature combinations. Embodiments and feature combinations are also to be considered to be disclosed which therefore do not have all features of an originally formulated independent claim. In addition, embodiments and feature combinations are to be considered to be disclosed, in particular by the above-described embodiments, which go beyond or deviate from the feature combinations depicted in the references of the claims.

The invention will be explained in greater detail on the basis of preferred exemplary embodiments and with reference to the appended drawings.

In the figures.

In the figures, identical and functionally-identical elements are provided with the same reference signs.

Figure 1:
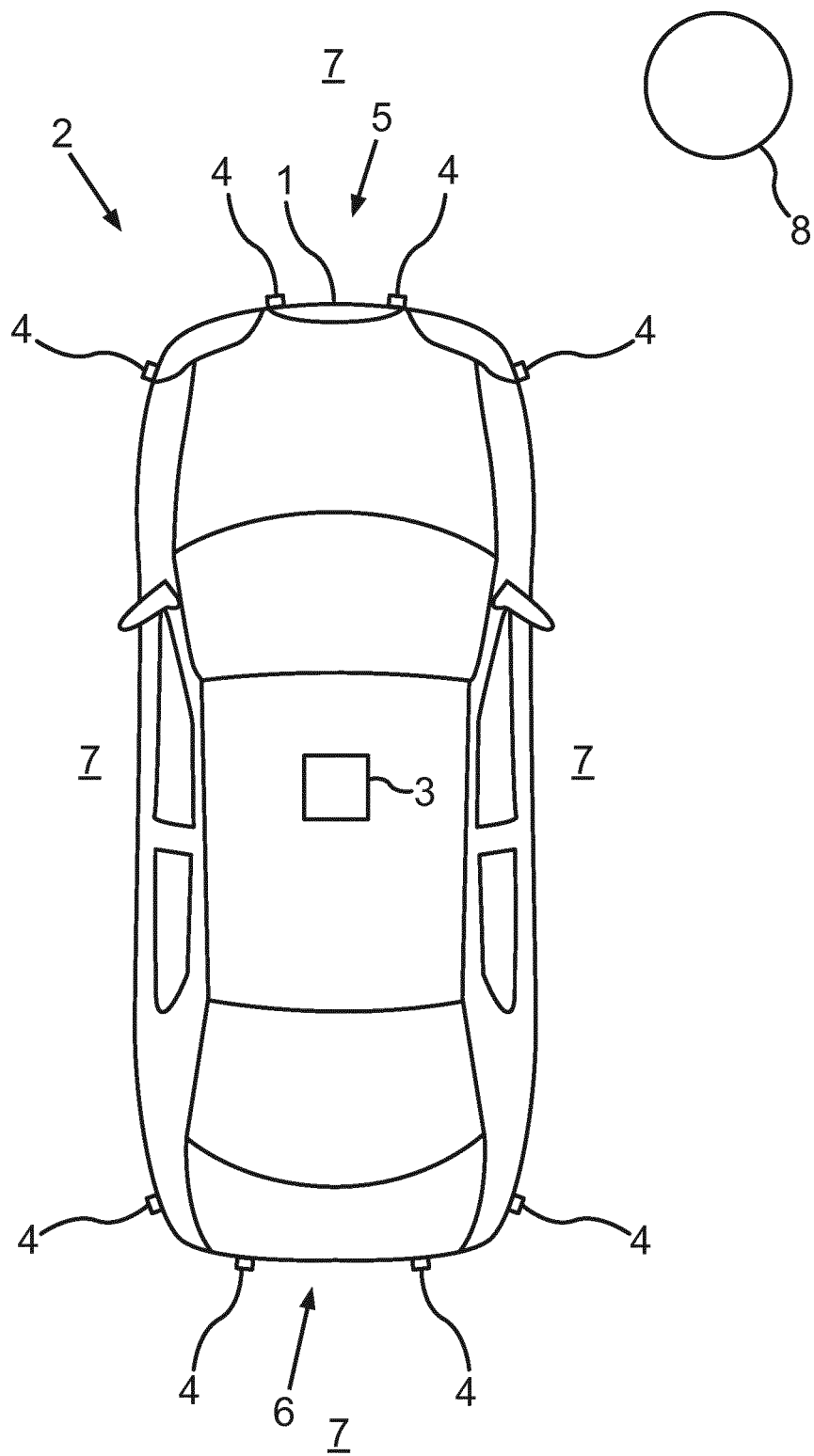
FIG. 1 shows a motor vehicle according to one embodiment of the present invention, which has a driver assistance system.

FIG. 1 shows a motor vehicle 1 according to one embodiment of the present invention in a top view. The motor vehicle 1 is designed in the present case as a passenger automobile. The motor vehicle 1 comprises a driver assistance system 2, which comprises a control unit 3. The control unit 3 can be formed, for example, by an electronic control unit (ECU) of the motor vehicle 1.

In addition, the driver assistance system 2 comprises a plurality of sensors 4, which are arranged distributed on the motor vehicle 1. The sensors 4 can be designed, for example, as ultrasound sensors, radar sensors, lidar sensors, laser scanners, or cameras. In the present case, the sensors 4 are designed as ultrasound sensors. In this case, four sensors 4 are arranged in a front region 5 and four sensors 4 are arranged in a rear region 6 of the motor vehicle 1. The number and arrangement of the sensors 4 is arbitrary. The driver assistance system 2 can also have 12 sensors 4. Objects 8 in a surroundings 7 of the motor vehicle 1 can be registered using the sensors 4. The sensors 4 are connected to the control unit 3 for data transmission.

The motor vehicle 1 is to be manoeuvred with the aid of the control unit 3. For this purpose, a trajectory, which describes the future movement of the motor vehicle, can be determined using the control unit 3 on the basis of sensor data which are provided using the sensors 4. Furthermore, a distance to go R, from which a brake system of the motor vehicle 1 is actuated, can be determined using the control unit 3. For this purpose, on the one hand, a notification distance DTH is determined, which describes a distance to a turning point of the trajectory during the travel along the trajectory. In addition, a collision distance DTC is determined, which describes a distance to the object 8 during the travel along the trajectory.

Figure 2:
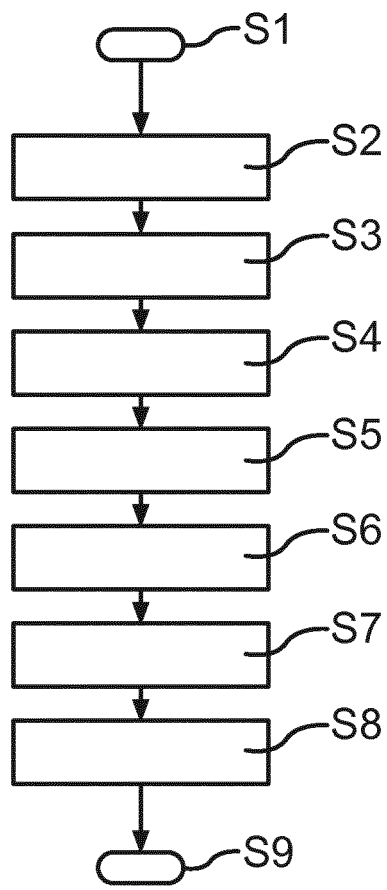
FIG. 2 shows a schematic flow chart of a method for manoeuvring the motor vehicle.

FIG. 2 shows a schematic flow chart of a method for manoeuvring the motor vehicle 1. In a step S1, the method is started. In a following step S2, it is checked whether a gear change has taken place. In a step S3, a corrected notification distance $DTH_k$ is determined. In a step S4, a corrected collision distance $DTC_k$ is determined. In a step S5, the corrected notification distance $DTH_k$ and the corrected collision distance $DTC_k$ are compared and in a step S6, the distance to go R is determined based on the corrected notification distance $DTH_k$ and the corrected collision distance $DTC_k$. In a step S7, this determined distance to go R is then smoothed. In a step S8, a notification is output if the notification distance DTH has been exceeded. Finally, the method is ended with a step S9.

To determine the corrected notification distance $DTH_k$, firstly the time curve of the notification distance DTH is determined. Subsequently, it is checked whether the time curve of the notification distance DTH has a jump 9, 10. This jump 9, 10 can then be smoothed accordingly to determine the corrected notification distance $DTH_k$. In the same manner, the time curve of the collision distance DTC can also be determined and can be smoothed to determine the corrected collision distance $DTC_k$.

Figure 3:
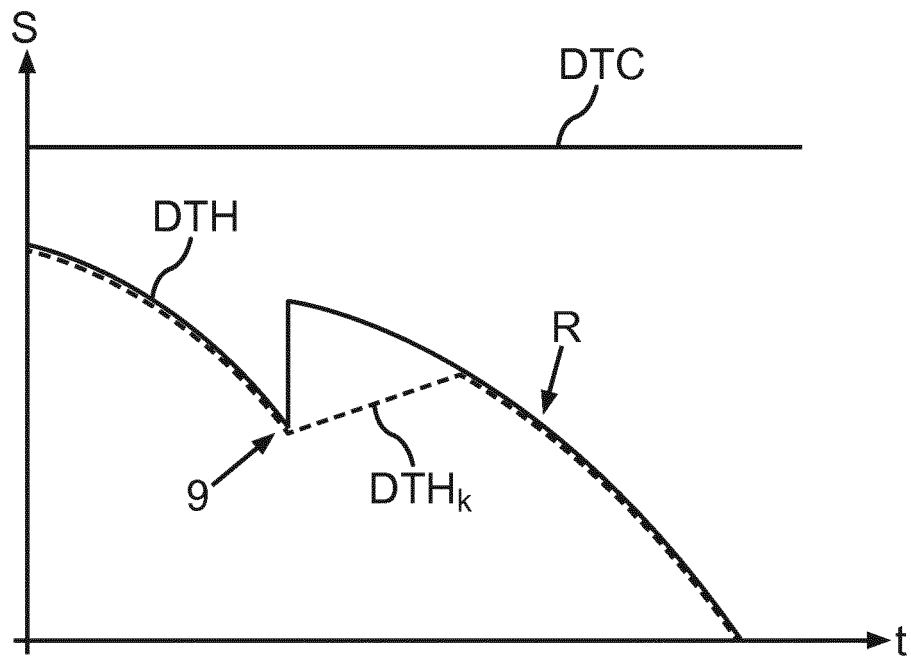
FIG. 3 shows a time curve of a notification distance and a collision distance.

FIG. 3 shows a curve of a distance S as a function of the time t. In this case, the time curve of the notification distance DTH and the time curve of the collision distance DTC are shown. The collision distance DTC is constant as a function of the time t. The time curve of the notification distance DTH has a positive jump 9. At the jump 9, it is checked whether a level of the jump 9 exceeds a threshold value. This is presently the case. It is provided in this case that this jump 9 is smoothed. A corrected notification distance $DTH_k$ is thus determined, which is determined in that it is consistently elevated from the point in time of the jump 9. The corrected notification distance $DTH_k$ thus has a ramp-shaped curve from the point in time of the jump 9. Otherwise, the curve of the corrected notification distance $DTH_k$ corresponds to the curve of the notification distance DTH. In this case, the curve of the corrected notification distance $DTH_k$ also corresponds to the curve of the distance to go R.

Figure 4:
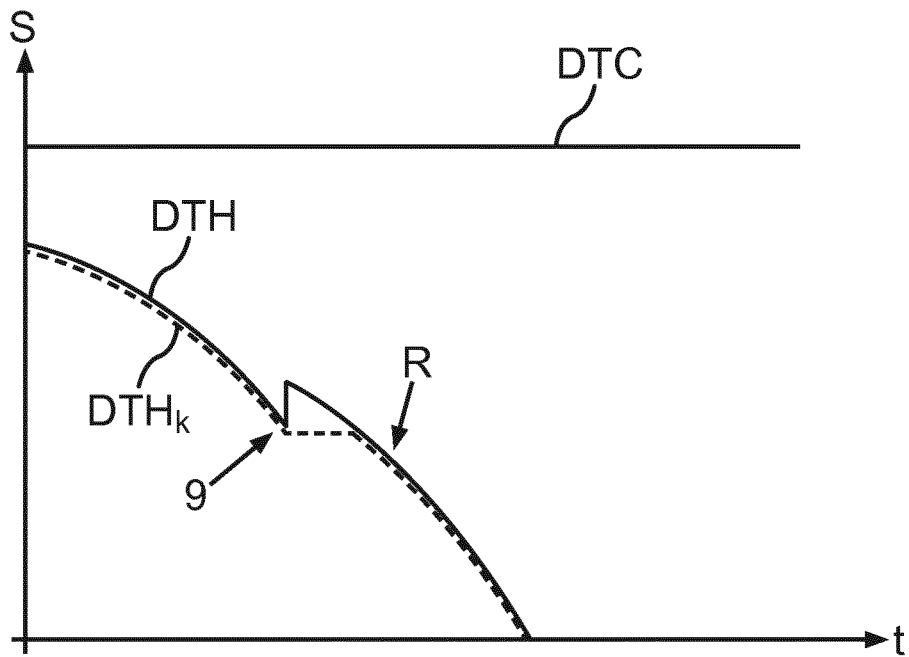
FIG. 4 shows a time curve of the notification distance and the collision distance in a further embodiment.

In comparison thereto, FIG. 4 shows an example in which the time curve of the notification distance DTH has a positive jump 9, wherein the level of the jump 9 is less than the predetermined threshold value. In this case, to determine the corrected notification distance $DTH_k$, the corrected notification distance $DTH_k$ is assumed to be constant until the time curve of the notification distance DTH again has the constant value of the corrected notification distance $DTH_k$.

Figure 5:
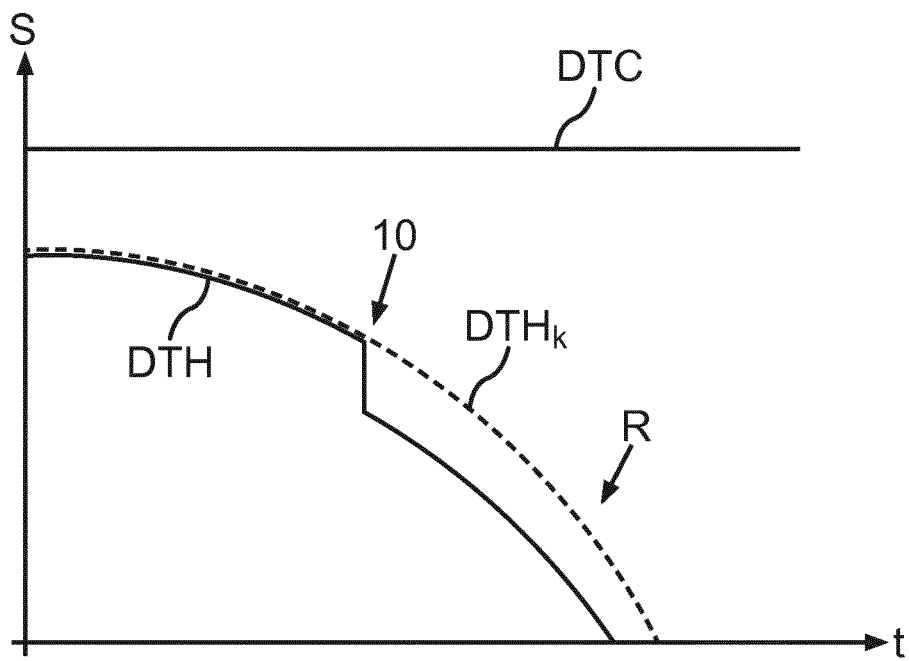
FIG. 5 shows a time curve of the notification distance and the collision distance in a further embodiment.

FIG. 5 shows a further example in which the time curve of the notification distance DTH has a negative jump 10. This negative jump 10 can be compensated for in that an offset is added to the notification distance DTH for the notification distance DTH in the region of the negative jump 10. The curve of the corrected notification distance $DTH_k$ results therefrom.

If the collision distance DTC has a positive jump 9, this can be smoothed similarly to the method described in FIG. 3 and FIG. 4 for the notification distance DTH. If the collision distance DTC has a negative jump 10, it is not smoothed. It can thus be guaranteed that a collision with the object 8 is avoided. This is suitable in particular if the object 8 is a dynamic or movable object 8.

Figure 6:
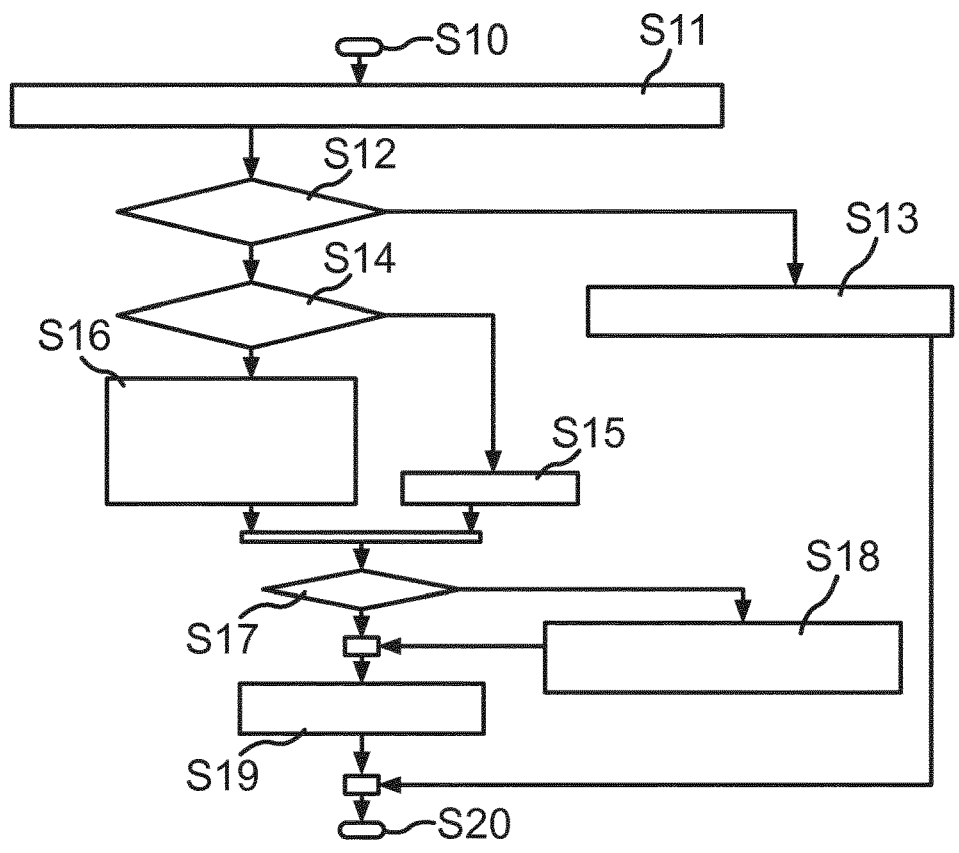
FIG. 6 shows a schematic flow chart of a method for determining a corrected notification distance.

FIG. 6 shows a schematic flow chart of a method for determining the corrected notification distance $DTH_k$. The method is started in a step S10. In a step S11, the present notification distance DTH is determined as the distance to the turning point. In a step S12, it is checked whether the time curve of the notification distance DTH has a jump 9, 10. If this is not the case, in a step S13, the notification distance DTH is determined as the corrected notification distance $DTH_k$ on the basis of the time curve. If a jump 9, 10 was recognized in step S12, it is checked in a step S14 whether the level of the jump is less than the predetermined threshold value. If this is the case, the corrected notification distance $DTH_k$ is kept constant (step S15). If the level of the jump 9, 10 is greater than the threshold value, the corrected notification distance $DTH_k$ is elevated according to the ramp in a step S16. In a step S17, it is furthermore checked whether a jump 9, 10 is present. If this is the case, in a step S18, a further smoothing of the jump 9, 10 is carried out. Otherwise, in a step S19, the corrected notification distance $DTH_k$ is determined. Finally, the method is ended in a step S20.

Figure 7:
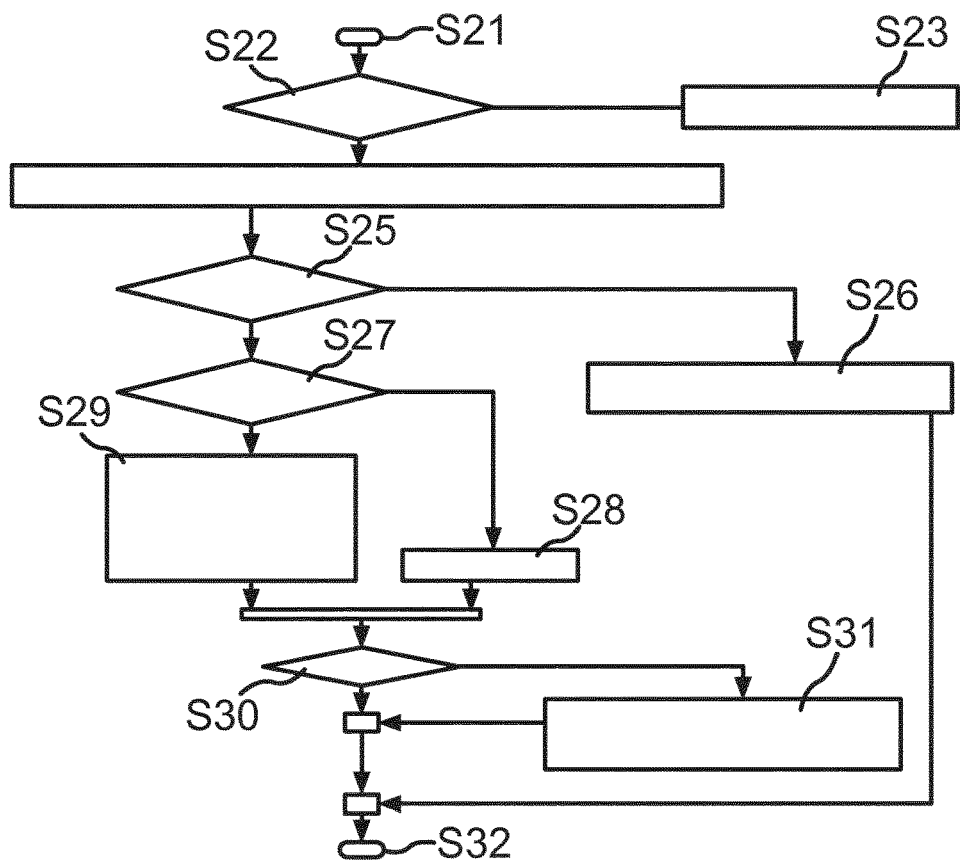
FIG. 7 shows a schematic flow chart of a method for determining a corrected collision distance.

FIG. 7 shows a schematic flow chart of a method for determining the corrected collision distance $DTC_k$. The method is started in a step S21. In a step S22, it is checked whether the corrected collision distance $DTC_k$ is greater than a limiting value. If this is the case, the collision distance DTC is used as the corrected collision distance $DTC_k$ (step S23). If this is not the case, in a step S24, the present collision distance DTC is determined as a function of the distance already covered. In a step S25, it is checked whether a positive jump 9 or a negative jump 10 is present in the time curve of the collision distance DTC. If a negative jump 10 is present, in a step S26, the corrected collision distance $DTC_k$ is considered to be the collision distance DTC. If a positive jump 9 is present, it is checked in a step S27 whether the level of the jump 9 is greater than the predetermined threshold value. If this is not the case, the corrected collision distance $DTC_k$ is kept constant (step S28). Otherwise, in a step S29, a ramp is determined. In a step S30, a check is carried out as to whether the corrected collision distance $DTC_k$ is less than a threshold value. If this is not the case, the corrected collision distance $DTC_k$ is determined on the basis of the covered route (step S31). Finally, the method is ended in a step S32.

Figure 8:
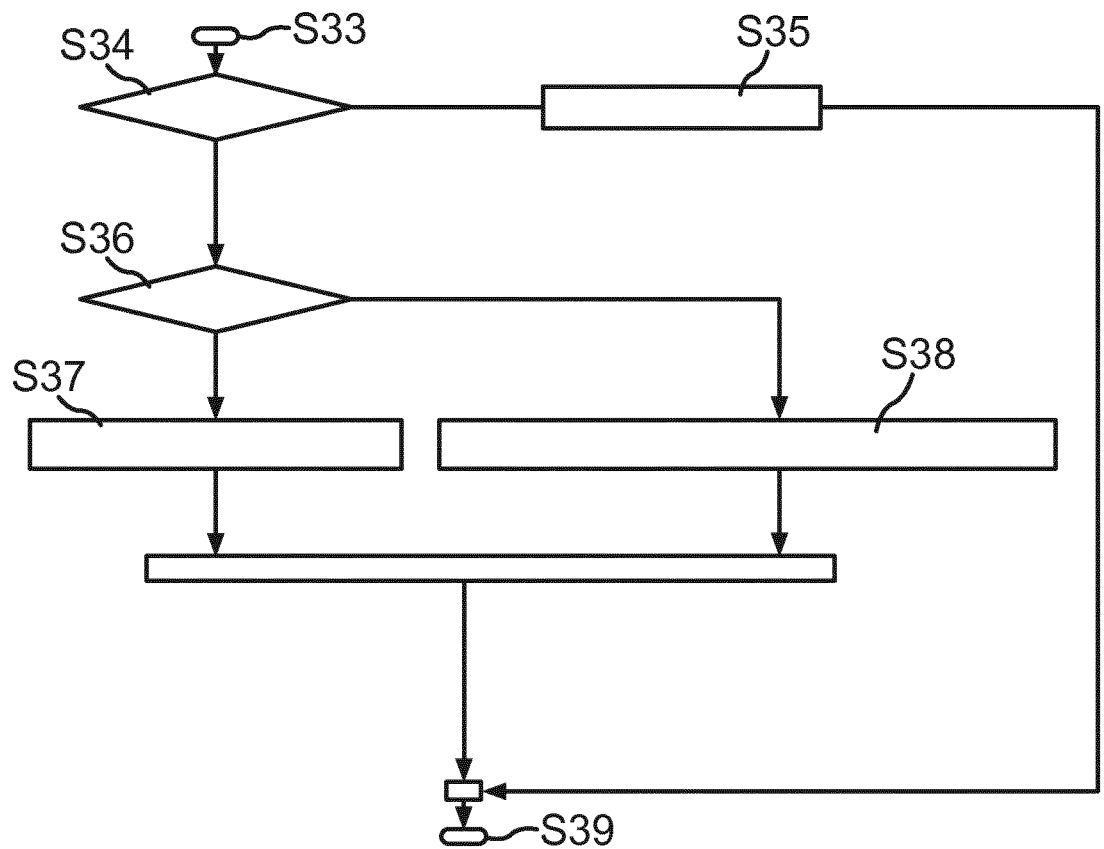
FIG. 8 shows a schematic flow chart of a method for determining a distance to go until the actuation of a brake system.

FIG. 8 shows a schematic flow chart of a method for determining the distance to go R. The method is started in a step S33. In a step S34, it is checked whether during the determination of the distance to go R, a change has taken place between the collision distance DTC and the notification distance DTH or vice versa and whether a jump 9, 10 is present at the transition. If this is not the case, in a step S35, no smoothing of the distance to go R takes place. It is then checked in a step S36 whether a ramp is already present for smoothing the jump 9, 10. If this is not the case, in a step S37, a ramp is determined. Otherwise, in a step S38, the existing ramp is followed further. Finally, the method is ended in a step S39.

In FIG. 9 to FIG. 18, different examples for determining the distance to go R on the basis of the time curve of the notification distance DTH and the time curve of the collision distance DTC are described.

Figure 9:
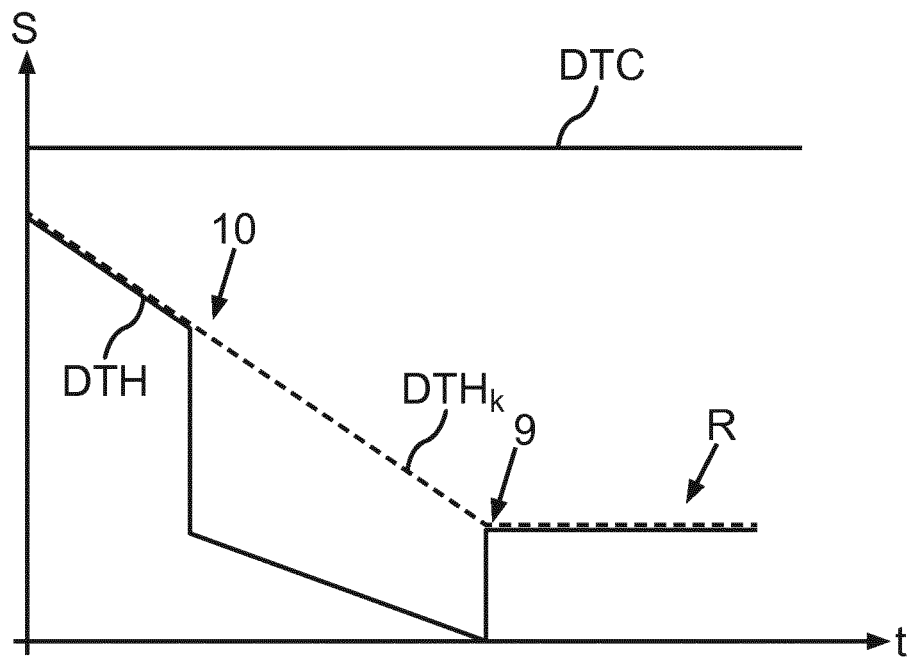
FIGS. 9 to 18: show different examples for determining the distance to go on the basis of the time curve of the notification distance and the collision distance.

FIG. 9 shows an example in which the collision distance DTC is constant and is greater than the notification distance DTH. The notification distance DTH firstly has a negative jump 10. As already described, an offset for smoothing this negative jump 10 is determined here. Subsequently, the notification distance DTH has a positive jump 9. This positive jump 9 equalizes the offset again or minimizes it. This means that the value of the offset is adapted in an ongoing manner to the jumps 9, 10 in order to smooth the distance to go R. The corrected notification distance $DTH_k$ can thus be determined, which in turn corresponds to the distance to go R.

Figure 10:
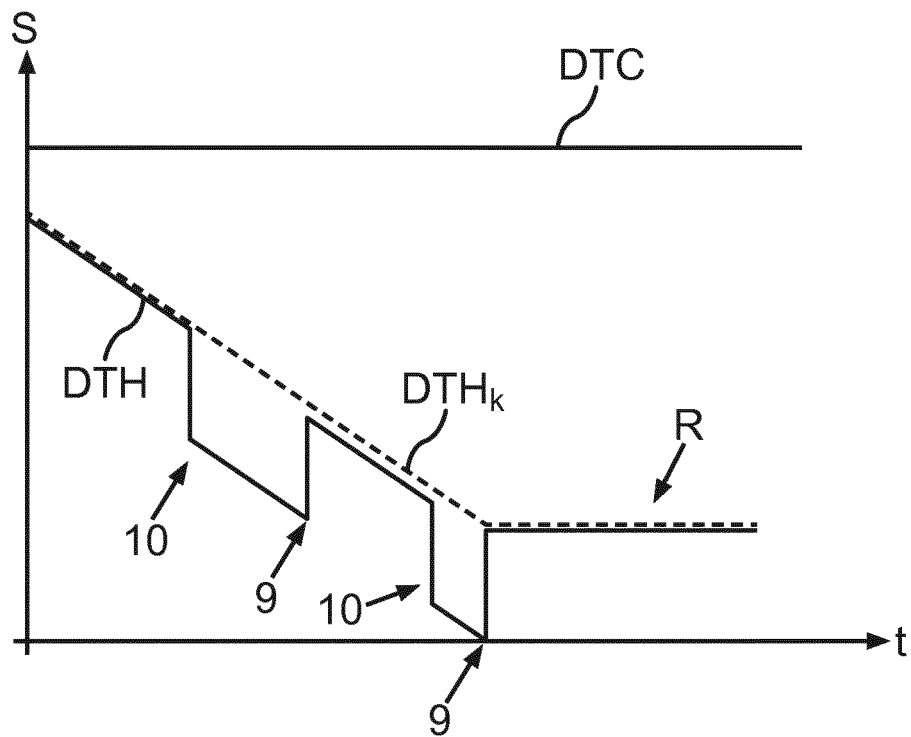

FIG. 10 shows an example in which the collision distance DTC is constant and is greater than the notification distance DTH. The notification distance DTH firstly has a negative jump 10, which is adjoined by a positive jump 9. Moreover, the notification distance DTH has a further negative jump 10, which is in turn adjoined by a positive jump 9. In this case, the offset during the respective jumps 9, 10 is determined such that both successive jumps 9, 10 can be smoothed. The distance to go R corresponds to the time curve of the corrected notification distance $DTH_k$.

Figure 11:
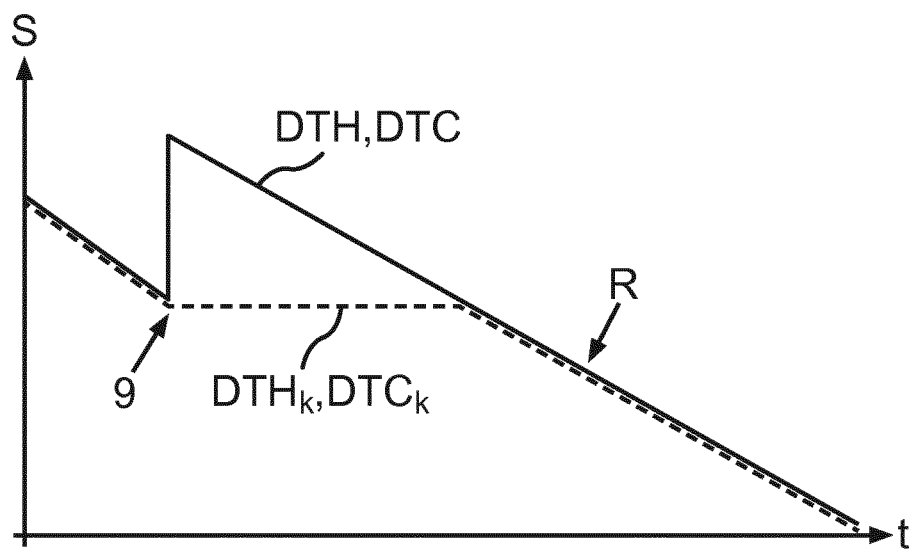

FIG. 11 shows an example in which a comparatively small positive jump 9 is present. This applies both for a positive jump 9 in the time curve of the notification distance DTH and also for a positive jump 9 in the time curve of the collision distance DTC. These positive jumps 9 can be smoothed in that the corrected notification distance $DTH_k$ or the corrected collision distance $DTC_k$, respectively, is kept constant. The distance to go R corresponds to the time curve of the corrected notification distance $DTH_k$ or the time curve of the corrected collision distance $DTC_k$, respectively.

Figure 12:
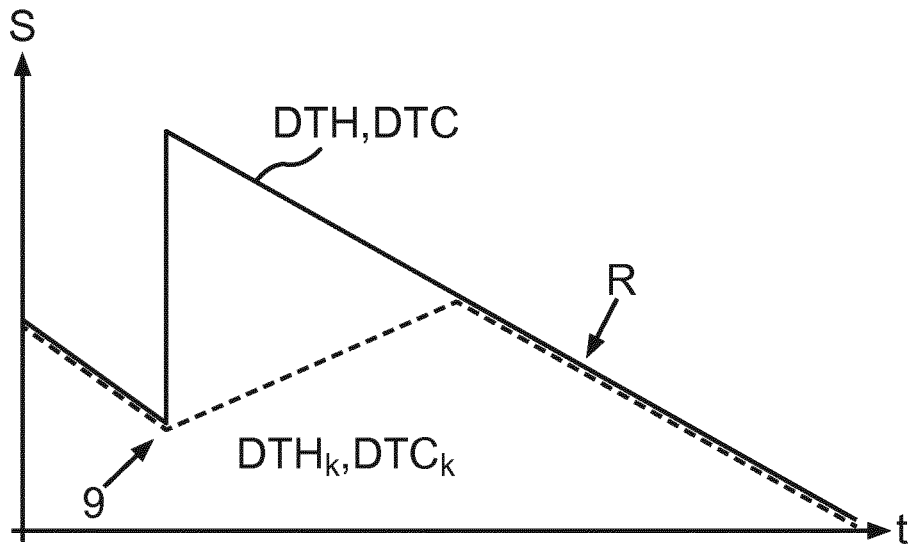

In comparison thereto, FIG. 12 shows an example in which the notification distance DTH and/or the collision distance DTC have a comparatively large jump 9. A ramp can be determined here for determining the corrected notification distance $DTH_k$ or the corrected collision distance $DTC_k$, respectively. The distance to go R corresponds to the time curve of the corrected notification distance $DTH_k$ or the time curve of the corrected collision distance $DTC_k$, respectively.

Figure 13:
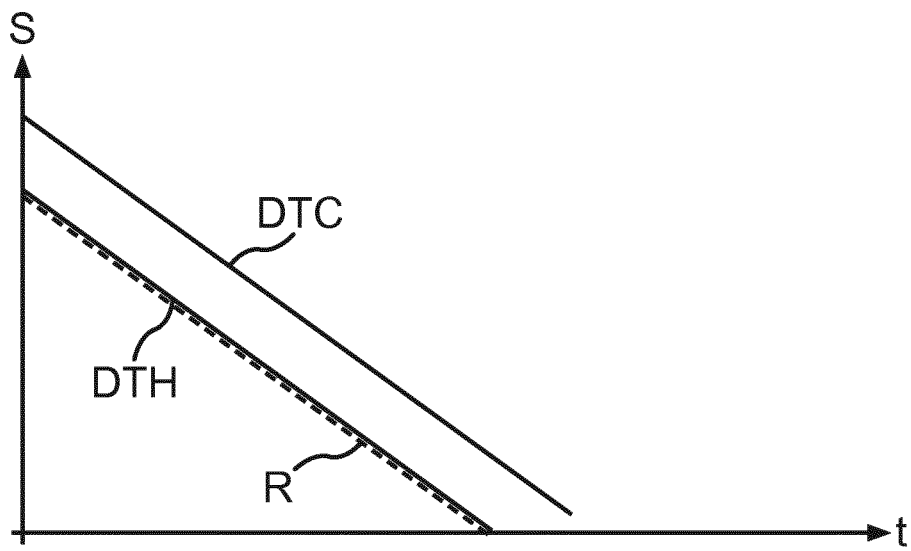

FIG. 13 shows an example in which neither the collision distance DTC nor the notification distance DTH has a jump. No adaptation of the notification distance DTH or the collision distance DTC is required here. The distance to go R results here from the minimum of notification distance DTH and collision distance DTC. This applies for the case in which the collision distance DTC is greater than the notification distance DTH. Otherwise, the distance to go R is determined on the basis of the collision distance DTC.

Figure 14:
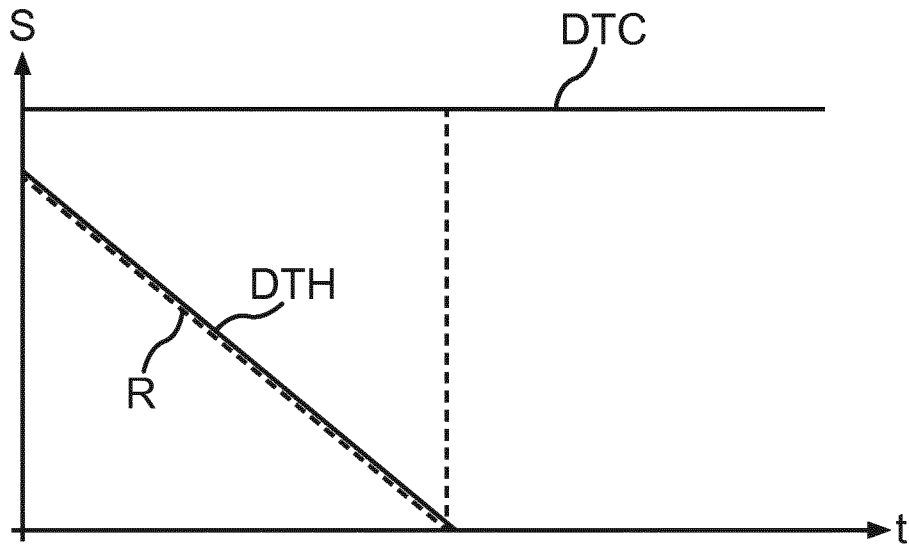

In the example of FIG. 14, the collision distance DTC is constant as a function of the time t. Moreover, the collision distance DTC is greater than the notification distance DTH. The notification distance DTH has a linear curve and no jumps. The distance to go R corresponds to the notification distance DTH here.

Figure 15:
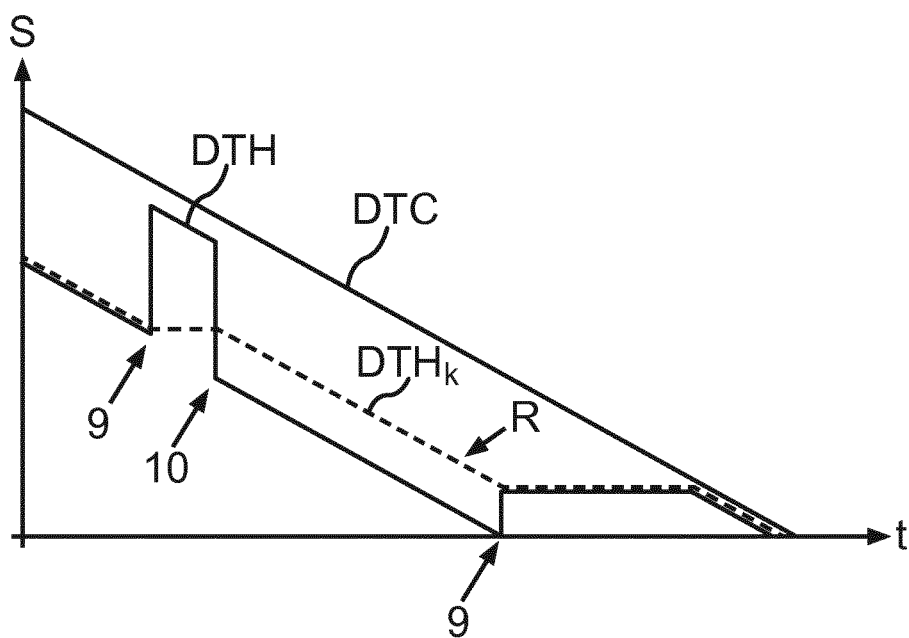

FIG. 15 shows an example in which the collision distance DTC has a linear curve, wherein the collision distance DTC is greater than the notification distance DTH. The notification distance DTH initially has a comparatively small positive jump 9. In this case, the corrected notification distance $DTH_k$ is kept constant for the duration of the positive jump 9. Subsequently, the notification distance DTH has a negative jump 10. The offset is added to the notification distance DTH here. The distance to go R corresponds to the time curve of the corrected notification distance $DTH_k$.

Figure 16:
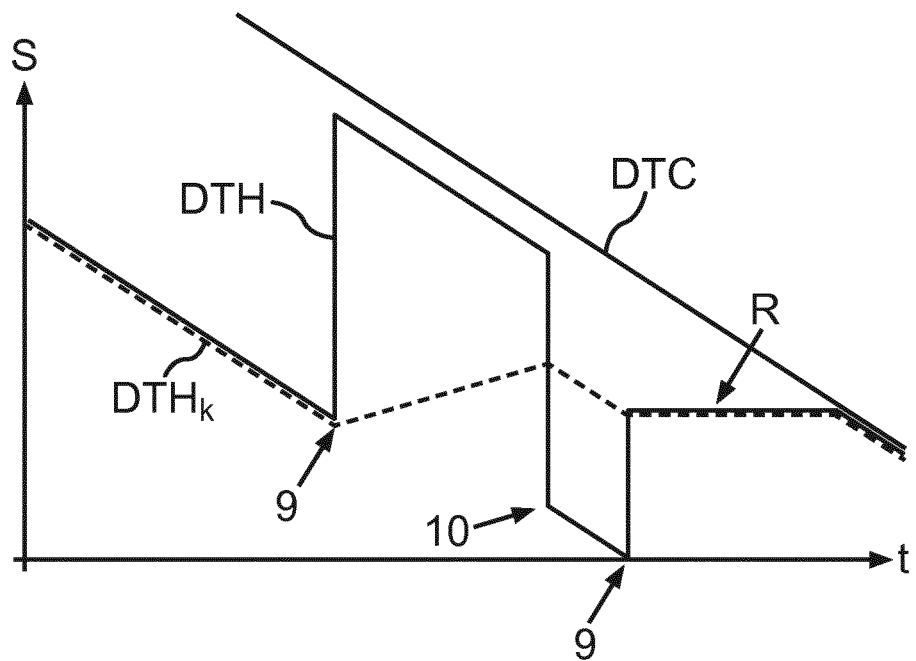

FIG. 16 shows an example in which the collision distance DTC has a linear curve, wherein the collision distance DTC is greater than the notification distance DTH. The notification distance DTH initially has a comparatively high positive jump 9. The corrected notification distance $DTH_k$ is approximated here in the region of the jump 9 by a ramp. In the case of the following negative jump 10 of the notification distance DTH, the offset is added to the notification distance DTH. The distance to go R corresponds to the time curve of the corrected notification distance DTHk.

Figure 17:
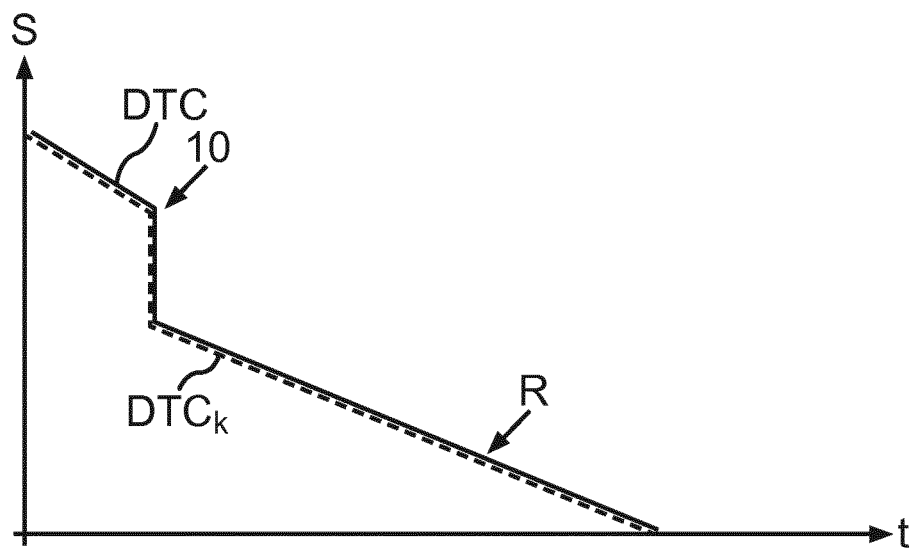

FIG. 17 shows an example in which the time curve of the collision distance DTC has a negative jump 10. The notification distance DTH is not shown in the present case. This negative jump 10 is not smoothed in order to avoid a possible collision with the object 8. In this case, the corrected collision distance $DTC_k$ corresponds to the curve of the collision distance DTC. This applies for the case in which the notification distance DTH is greater than the collision distance DTC. The distance to go R corresponds to the time curve of the collision distance DTC or the corrected collision distance $DTC_k$, respectively.

Figure 18:
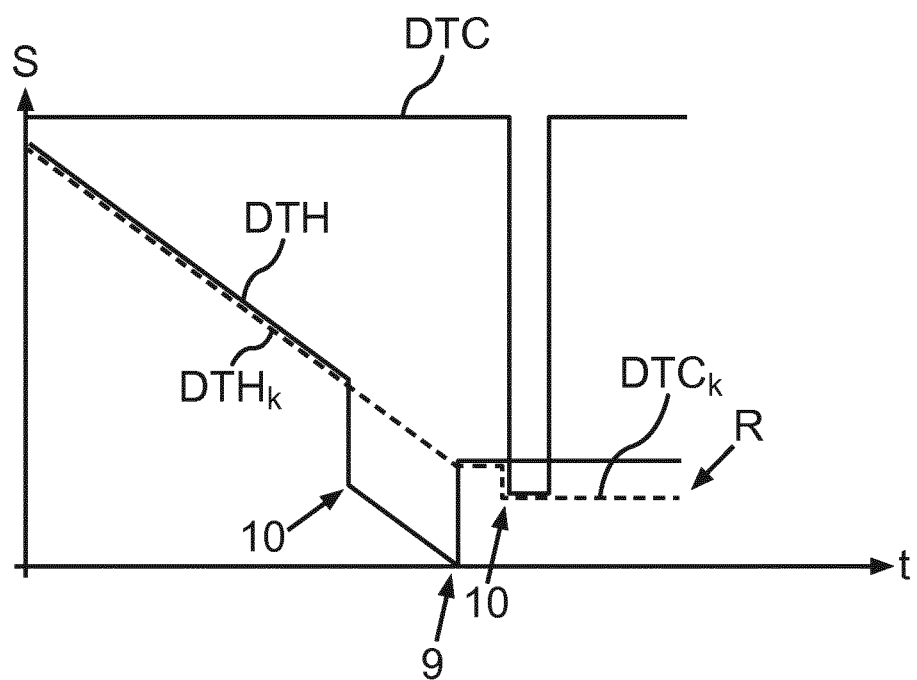

Finally, FIG. 18 shows an example in which the notification distance DTH initially has a negative jump 10, which is smoothed by the offset. Subsequently, the collision distance DTC has a negative jump 10. The negative jump 10 of the collision distance DTC can result, for example, due to a dynamic object 8, which is registered using the sensors 4. The negative jump 10 in the time curve of the collision distance DTC is not smoothed. To determine the distance to go R, the minimum of the corrected notification distance $DTH_k$ and the corrected collision distance $DTC_k$ is used.

The invention claimed is:

1. A method for manoeuvring a motor vehicle, comprising:
   determining, by a processor, a trajectory for manoeuvring the motor vehicle;
   determining, by the processor using data from a sensor and during the manoeuvring of the motor vehicle along the trajectory, a notification distance, which describes a distance to a turning point of the trajectory, and a collision distance, which describes a distance to an object in a surrounding of the motor vehicle, wherein the object is entered in a digital surrounding map which describes the surrounding;
   based on the notification distance and the collision distance, determining a distance to go until the actuation of a brake system of the motor vehicle;
   based on changes in the time curve of the notification distance, determining a corrected notification distance in an ongoing manner;
   based on changes in the time curve of the collision distance, determining in an ongoing manner, a corrected collision distance; and
   controlling the motor vehicle using the distance to go to prevent the motor vehicle from colliding with another object, wherein the distance to go is further determined in an ongoing manner based on the corrected notification distance and the corrected collision distance, and the distance to go is a remaining distance the motor vehicle can travel before actuation of the brake system.

2. The method according to claim 1, wherein, to determine the corrected notification distance and the corrected collision distance, a jump in the time curve of the notification distance or in the time curve of the collision distance is detected as a change.

3. The method according to claim 1, wherein, if a positive jump in the time curve of the notification distance and/or the collision distance is detected as a change and a level of the positive jump falls below a predetermined threshold value, the corrected notification distance and/or the corrected collision distance are assumed to be constant.

4. The method according to claim 1, wherein, if a positive jump in the time curve of the notification distance or the collision distance is detected as a change and a level of the positive jump exceeds a predetermined threshold value, the corrected notification distance or the corrected collision distance are elevated.

5. The method according to claim 1, wherein, if a negative jump is detected as a change in the time curve of the notification distance, a value is added to the time curve of the notification distance to determine the corrected notification distance.

6. The method according to claim 1, wherein, if a negative jump is detected as a change in the time curve of the collision distance, the collision distance is assumed as the corrected collision distance.

7. The method according to claim 1, wherein the distance to go is determined on the basis of a minimum of the corrected notification distance and the corrected collision distance if the corrected notification distance is greater than the corrected collision distance.

8. The method according to claim 1, wherein, to determine the corrected notification distance and/or the corrected collision distance, jumps between the time curve of the notification distance and the time curve of the collision distance are smoothed.

9. The method according to claim 1, wherein a notification is output if the notification distance is exceeded during the manoeuvring of the motor vehicle.

10. The method according to claim 1, wherein a determination of the corrected notification distance and the corrected collision distance is updated after a gear change of the motor vehicle.

11. A control unit for a driver assistance system of a motor vehicle, the control unit comprising a processor connected to a sensor, wherein the control unit:
- determines a trajectory for manoeuvring the motor vehicle;
- determines, during the manoeuvring of the motor vehicle along the trajectory, a notification distance, which describes a distance to a turning point of the trajectory, and a collision distance, which describes a distance to an object in a surrounding of the motor vehicle, wherein the object is entered in a digital surrounding map which describes the surrounding;
- determines, based on the notification distance and the collision distance, a distance to go until the actuation of a brake system of the motor vehicle;
- determines, based on changes in the time curve of the notification distance, a corrected notification distance in an ongoing manner;
- determines, based on changes in the time curve of the notification distance, a corrected collision distance in an ongoing manner;
- further determines, based on the corrected notification distance and the corrected collision distance, the distance to go in an ongoing manner; and
- controls the motor vehicle using the distance to go to prevent the motor vehicle from colliding with another object, wherein
the distance to go is a remaining distance the motor vehicle can travel before actuation of the brake system.

12. The driver assistance system for the motor vehicle comprising the control unit according to claim 11.

13. The motor vehicle comprising the driver assistance system according to claim 12.

* * * * *